Figure 1:
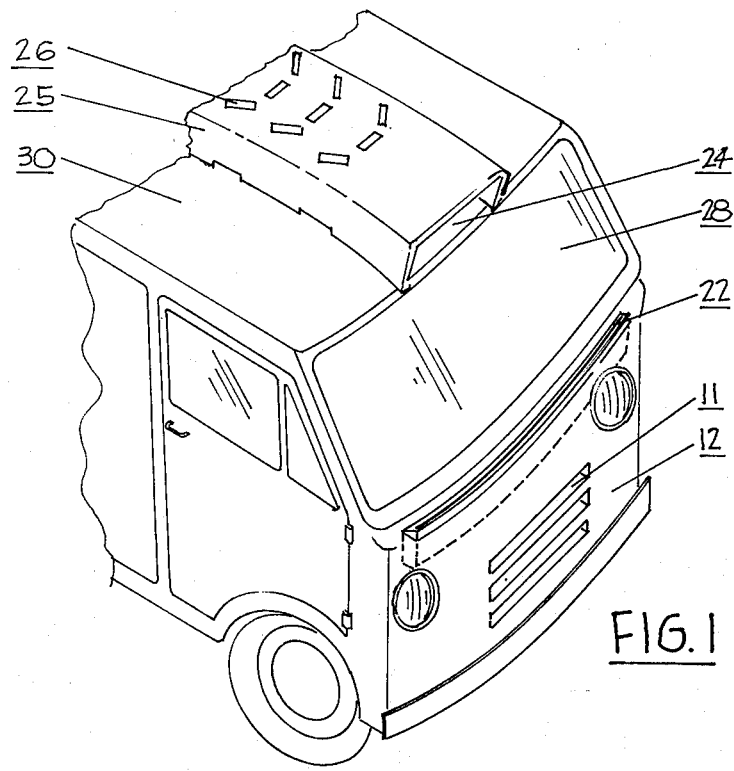

United States Patent [19]
McKeen

[11] 3,910,623
[45] Oct. 7, 1975

[54] MEANS AND METHODS FOR REDUCING ONCOMING AIR RESISTANCE AND ANGLE WIND EFFECTS TO A MOVING VEHICLE

[76] Inventor: Joseph E. McKeen, 10861 Elm Ave., Lynwood, Calif. 90262

[22] Filed: Jan. 3, 1972

[21] Appl. No.: 214,689

[52] U.S. Cl. ................................ 296/1 S; 296/91
[51] Int. Cl.² ........................................ B62D 35/00
[58] Field of Search ........ 296/1 S, 91; 105/2 R, 2 A

[56] References Cited
UNITED STATES PATENTS

| | | | |
|---|---|---|---|
| 2,361,924 | 11/1944 | Boyton | 296/1 S |
| 2,514,695 | 7/1950 | Dempsey | 105/2 R |
| 2,863,695 | 12/1958 | Stamm | 296/1 S |
| 3,516,707 | 6/1970 | Wilfert | 296/1 S |
| 3,616,871 | 11/1971 | West | 296/91 |

Primary Examiner—David Schonberg
Assistant Examiner—John A. Pekar
Attorney, Agent, or Firm—Dominick Nardelli

[57] ABSTRACT

The effects of oncoming air resistance and angle winds on a moving vehicle are minimized by forcing air at relatively high velocity up through a transverse nozzle system extending across the vehicle's front and providing a means for directing a portion of said air through a vented duct along the vehicle's roof. Air from the nozzle system follows the front contour of the vehicle up and across the windshield and further tends to flow back along the vehicle's roof. Oncoming air in front of the vehicle also follows this air stream along the contour of the vehicle. A low pressure region is thereby created to the vehicle's front. A portion of the front air enters the duct that extends along the vehicle's roof. Air entering and exiting through top vents in the duct tends to control boundary air across and along the vehicle's roof and assist in filling the void to the vehicle's rear.

4 Claims, 2 Drawing Figures

U.S. Patent   Oct. 7, 1975   3,910,623

INVENTOR
Joseph E. McKeen
BY
John Joseph Hall
ATTY.

MEANS AND METHODS FOR REDUCING ONCOMING AIR RESISTANCE AND ANGLE WIND EFFECTS TO A MOVING VEHICLE

BACKGROUND OF THE INVENTION

1. Field of the Invention

This invention relates to means and methods for reducing oncoming air resistance and angle wind effects on a moving vehicle by creating a low pressure region adjacent to the vehicle's front end and tends to control boundary air currents across and along the vehicle's roof.

2. Prior Art

Applicant knows of no instance where a means or method such as applicant's has been used to successfully reduce oncoming air resistance and angle wind effects on a moving vehicle. Some attempts have been made to minimize the drag at the rear of a moving vehicle by employing baffles which deflect oncoming air around the back of the vehicle to prevent the buildup of circular air currents at that point. Nevertheless, no attempt has been made to applicant's knowledge to reduce the effects of oncoming air resistance or angle winds on a vehicle in motion which are far more acute problems.

SUMMARY OF THE INVENTION

A vehicle such as a truck or van or bus is equipped with a transverse slot nozzle extending across its front end. The form of nozzle permits a relatively high velocity air stream to flow out of the nozzle from a suitable source, such as the engine compartment of the vehicle. This air stream follows the front contour of the vehicle up and across the windshield and flows back along the vehicle's top. This air stream carries the oncoming air in front of the vehicle with it as the vehicle moves, so that the oncoming air also follows the contour of the front end and flows across the windshield and back along the vehicle's top, thereby creating a low pressure region in front of the vehicle.

The vehicle is also equipped with a vented duct extending over the length of the vehicle's roof. A portion of the front air would enter the duct. Air entering or exiting through the top vents in the duct controls or minimizes boundary air currents across and along vehicle's roof. The direction and flow of air through the vents in the duct is controlled by the changing pressure regions outside the duct. The air exiting the end of the duct assists in filling the void at the rear of the vehicle.

The relatively high velocity air stream from the nozzle has the added effect of protecting the vehicle's windshield from costly sandstorm pitting due to high density airborne sand particles as well as from other airborne particles.

A further effect of the air stream is in removing or minimizing the buildup of insects, water or dirt on the windshield, and, where the air is heated, the heated air stream aids in removing or minimizing the buildup of ice and snow on the windshield, thereby improving driver visibility during foul weather.

It is, therefore, an object of this invention to provide means for lowering the air resistance to the front end of a moving vehicle.

Another object of this invention is to provide methods for lowering air resistance to the front end of a moving vehicle.

Another object of this invention is to provide means of controlling angle wind effects on a moving vehicle.

Still another object of this invention is to provide methods of controlling angle wind effects on a moving vehicle.

A further object of this invention is to provide means for removing or minimizing the accumulation or buildup of insects, water, dirt, ice and snow on the vehicle's windshield, thereby improving driver visibility.

A still further object of this invention is to provide methods for removing or minimizing the accumulation or buildup of insects, water, dirt, ice and snow on the vehicle's windshield, thereby improving driver visibility.

Yet another object of this invention is to provide means of protecting the vehicle's windshield from costly sandstorm pitting damage, and from other airborne particles.

Still another object of this invention is to provide methods of protecting the vehicle's windshield from costly sandstorm pitting damage, and from other airborne particles.

A yet further object of this invention is to provide the foregoing means and methods by relatively simple and inexpensive modifications and additions to a conventional vehicle.

These and other objects will be more readily understood by reference to the following description and claims, taken in conjunction with the accompanying drawing, in which FIG. 1 is a fragmentary perspective view of an embodiment of my invention with parts cut away of a conventional vehicle.

Figure 2:
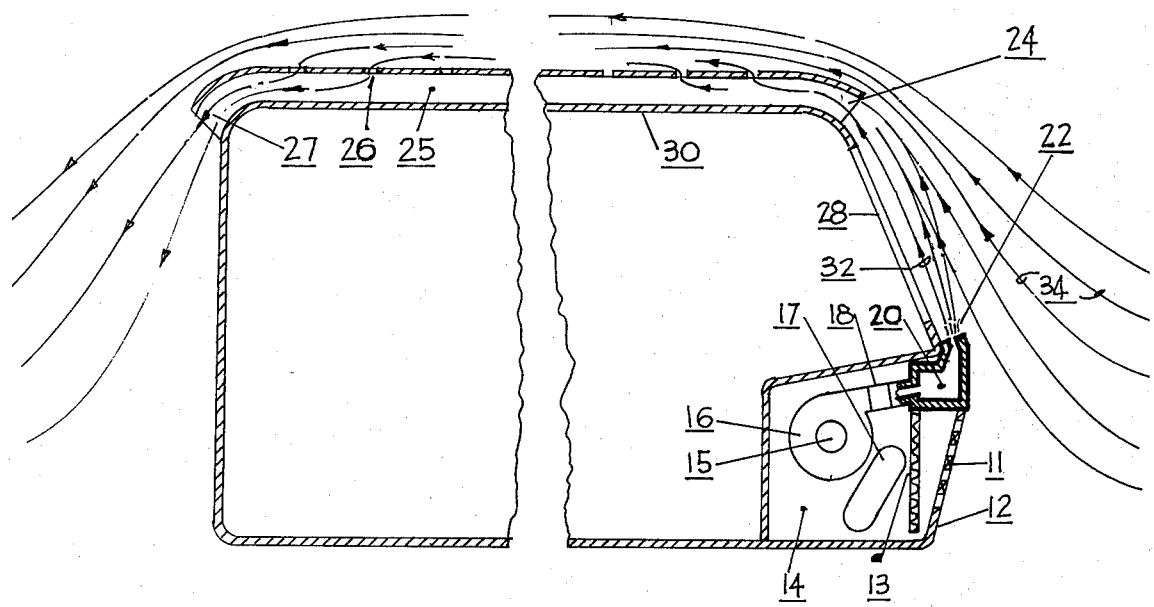

FIG. 2 is a fragmentary side elevational view in section of a conventional vehicle of the type shown in FIG. 1.

With respect to the drawings, a conventional vehicle such as van 10 has a grille 11 in its front end 12 opening into its engine compartment 14. The van is equipped with an air pump or blower 16 located preferably in its engine compartment 14. Blower 16 is connected to a conduit or hose 18 which leads to a manifold 20. The front end 12 has a transverse slot nozzle 22 formed in it, adjacent to manifold 20. The orifice of slot nozzle 22 is formed so as to direct the air passing out of slot nozzle 22 up and over the front contour of van 10.

In operation, blower 16 draws air in through grille 11, through filter 13 into engine compartment 14 and over heated engine parts 17. Air then enters blower intake 15 where blower 16 compresses and discharges the air through hose 18 into manifold 20 and out through slot nozzle 22. As air stream 32 is discharged upwards from slot nozzle 22 at a relatively high velocity, it follows the front contour of van 10 up and across windshield 28 and tends to continue to flow back along the vehicle's top wall 30. A portion of air stream 32 flows into duct 25 at its entrance 24.

The flow of air stream 32 is at a relatively rapid rate due to the action of blower 16 and accordingly, air stream 32 tends to cause the oncoming air stream indicated by arrows 34 to follow and to join the path of air stream 32 up and along the contour of windshield 28 and the top wall 30. A portion of air stream 34 also enters duct 25 at entrance 24.

The movement of air stream 34 along the path of air stream 32 causes a reduction in the air pressure at front end 12 of van 10 so that air resistance to the front end 12 of van 10 is substantially decreased as van 10 moves ahead.

Due to the decrease in air resistance to the movement of van 10, substantial savings in fuel consumption of van 10 are produced and substantial improvement in the stability and control of van 10 also occurs.

Duct 25 has vents 26 along its length. Air exits duct 25 through vents 26 when the pressure around duct 25 is lower than the pressure inside duct 25. Air enters duct 25 through vents 26 when the pressure outside duct 25 is greater than the pressure inside duct 25. This effect tends to reduce the effects of angle winds and vehicle-induced wind currents. Substantial improvement in vehicle stability and control results. Air in duct 25 exits at duct exit 27 where it aids in filling the void behind van 10. Moreover, the flow of air stream 32 removes or minimizes existing accumulation or buildup of water or dirt or insects on windshield 28, and, in the case of a heated air stream 32, accumulation or buildup of ice or snow would also be removed or minimized.

Any source of air — heated or not — may be used by blower 16, without adversely affecting the operation of my invention. It is preferable to use heated air produced by the method indicated above. It is understood though that various means and methods of forcing air up over or down under the front end or off to the sides of a vehicle may be used instead of the preferred embodiment described above.

Although I have described my invention in detail with reference to the accompanying drawing illustrating a preferred embodiment of my invention, it is understood that numerous changes in the details of construction and arrangement of parts may be made without departing from the spirit and scope of the invention as hereinafter claimed.

It is further understood that the scope of my invention is not limited to vehicles traveling on land, but includes airborne vehicles of various types as well.

I claim:

1. A method of reducing air resistance to a moving vehicle, comprising:
   forcing an air stream out through an opening in the front end of the vehicle,
   directing said air stream up and along the contour of the front end and top wall of said vehicle to cause the oncoming air in front of said vehicle to join and follow the path of said air stream, whereby the air resistance at the front end of the vehicle is decreased, and the front end of said vehicle is protected from particles carried by said oncoming air, and
   entering a portion of said air stream through a duct means accompanying said vehicle and having an inlet and outlet and vents along its length, whereby air may enter said duct through said vents when the air pressure outside said duct is greater than the air pressure inside said duct and whereby air may go through and out said duct through said vents when the air pressure around said duct is lower than the air pressure inside said duct, thereby reducing the effects of angle winds and wind currents induced by said vehicle as it moves.

2. A method according to claim 1 in which the airstream is heated.

3. A vehicle having means for lowering the resistance of oncoming air to its front end as the vehicle moves forward and for reducing the effects of angle winds and wind currents induced by said vehicle as it moves, comprising:
   a transverse opening in said front end, said opening having means for directing an air stream up the front end and along the top of said vehicle,
   means for producing a flow of air in an air stream out of said transverse opening, and
   duct means associated with the top of said vehicle and having an inlet and an outlet and vents along its length,
   whereby the oncoming air in front of said vehicle joins and follows the path of said air stream, thereby decreasing the air resistance to the front end of said vehicle, and protecting said front end from particles carried by said oncoming air, and whereby a portion of said air stream may enter said duct through said vents when the air pressure outside said duct is greater than the air pressure inside said duct and whereby air may go through and out said duct through said vents when the air pressure around said duct is lower than the air pressure inside said duct, thereby reducing the effects of angle winds and wind currents induced by said vehicle as it moves.

4. A vehicle according to claim 3 in which the means for producing a flow of air includes a means for heating said air.

* * * * *